United States Patent [19]
Wollin

[11] 4,339,024
[45] Jul. 13, 1982

[54] DUST-TIGHT SILO DISCHARGE PIPE ASSEMBLY

[75] Inventor: Roger W. Wollin, Lake Mills, Wis.

[73] Assignee: Fiberdome Incorporated, Lake Mills, Wis.

[21] Appl. No.: 184,036

[22] Filed: Sep. 4, 1980

[51] Int. Cl.³ .............................................. B65G 11/02
[52] U.S. Cl. .................................................... 193/34
[58] Field of Search ................. 193/2 R, 2 D, 29, 33, 193/34; 52/195, 196

[56] References Cited

U.S. PATENT DOCUMENTS

| | | | |
|---|---|---|---|
| 1,950,996 | 3/1934 | Potter | 193/34 |
| 3,048,282 | 8/1962 | Reiff | 193/29 X |
| 3,961,693 | 6/1976 | Bruecker | 193/29 X |
| 4,281,754 | 8/1981 | Seay | 193/34 |

Primary Examiner—Robert B. Reeves
Assistant Examiner—Gene A. Church
Attorney, Agent, or Firm—James E. Nilles

[57] ABSTRACT

An assembly for discharging ensilage from a silo, providing a substantially dust-tight path through which the ensilage may pass and also providing a discharge bag which need not be cut as the assembly is lowered within the silo. The assembly comprises an elongated, collapsible, ensilage discharge bag, a rigid, tubular pipe attached to the lower end of the bag, and funnel conduit means connecting a silo discharge window to the bag. The bag is collapsed or gathered around the tubular pipe when less than the entire length of the bag is needed, as for example, when the assembly is lowered alongside the silo to remove ensilage from its lower parts.

28 Claims, 7 Drawing Figures

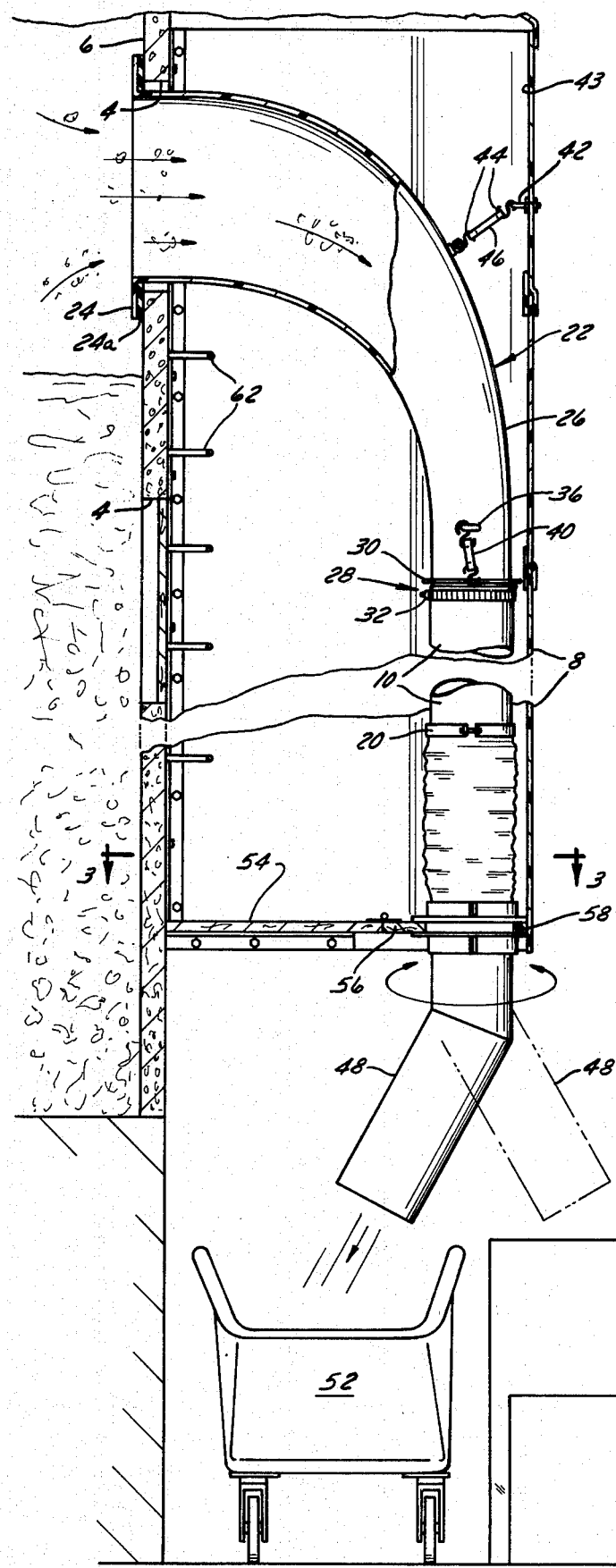
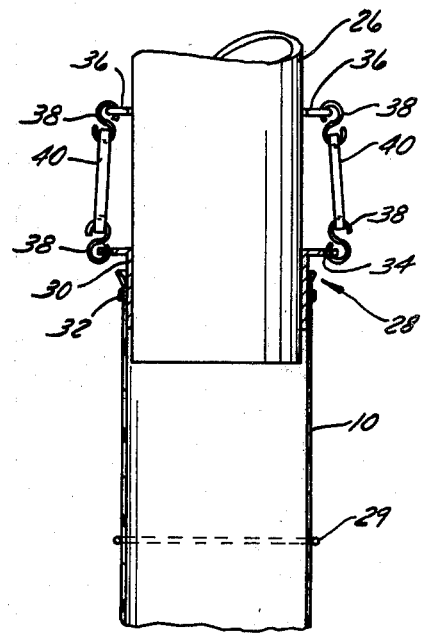
FIG. 5.
FIG. 2

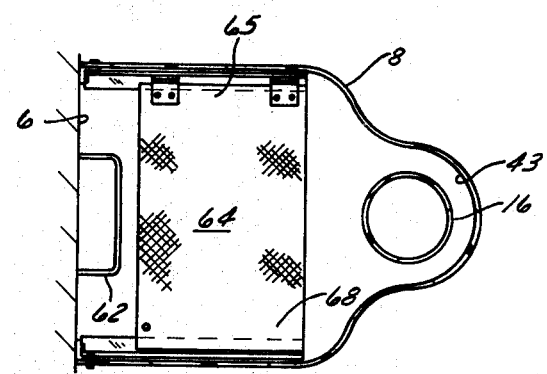
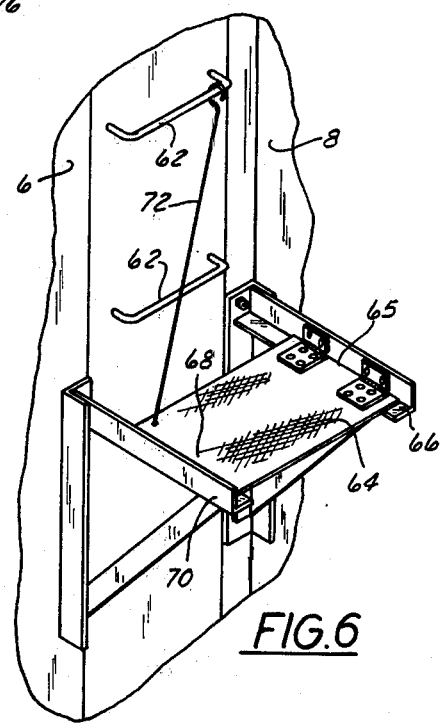
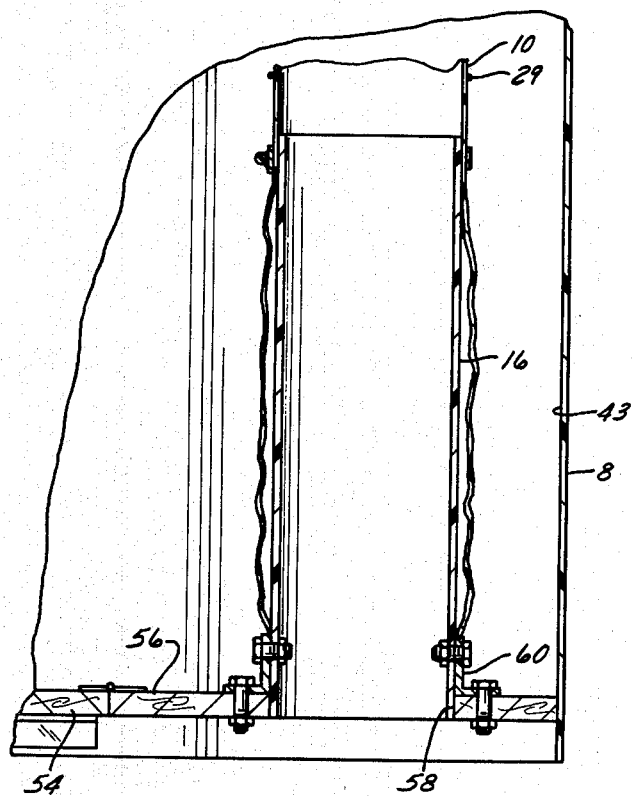
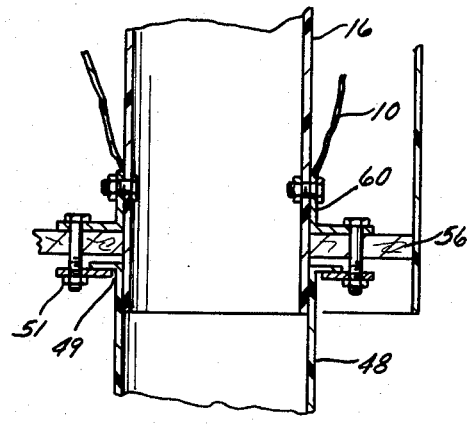

DUST-TIGHT SILO DISCHARGE PIPE ASSEMBLY

BACKGROUND OF THE INVENTION

1. Field of Use

This invention relates generally to a silo unloading apparatus such as is used to transfer ensilage from a window in a vertically upright silo to the ground. In particular, it relates to a silo discharge pipe assembly which both remains substantially dust-tight and is reusable.

2. Description of the Prior Art

Most silos are unloaded in one of two ways: through the bottom with a conventional auger, or through vertically spaced-apart windows on one side wall of the silo. Most silos unloaded through windows have a vertical chute alongside the window-containing side wall, and the ensilage is mechanically thrown from within the silo into the chute, dropping from there to a point below the window. The chute also acts as a service passage or manway, through which one may gain access to the windows by climbing ladder rungs attached to the portion of the side wall between the windows. To prevent the ladder rungs from accumulating ensilage as it passes through the chute, which accumulation would create a safety hazard, a separate discharge tube is located within the chute. Ensilage is transferred from within the silo to the ground or elsewhere only through this discharge tube and not through the rest of the chute in an attempt to keep the ladder rungs clean.

Many discharge tubes currently known are rigid and traverse substantially the entire vertical length of the chute. FIG. 1 of U.S. Pat. No. 3,797,625 issued to Price, on Mar. 19, 1974, shows such a rigid discharge tube. A funnel attached to one of a plurality of vertically spaced apart windows in the silo wall is used to transfer ensilage from the interior of the silo to the discharge tube. The funnel enters the discharge tube through a discharge opening therein. Each window has its own discharge opening, and each opening is closed by an adjustable sleeve when its corresponding window is not being used. A coupling sleeve engaged to a discharge opening permits attachment of the bottom of the funnel to the discharge tube when that discharge opening window is being used. The adjustable sleeves and coupling sleeves, in order to prevent leakage through the discharge openings, must have sealing surfaces around their perimeters or be made of a resilient material. These sealing surfaces or resilient materials may become brittle with time or damaged in handling, resulting in a loss of their effectiveness and a leakage of ensilage therethrough and into the chute.

In addition, the Price patent shows its discharge tube against the outer edge of a U-shaped chute. The U-shaped chute, as a combination manway and discharge tubeway, need only be deep enough from the silo wall to the outer edge of the chute to accommodate the man and the discharge tube. A U-shape affords the discharge tube very little protection from one climbing the manway if, upon tiring while climbing the rungs, he rests by leaning back against the outer end of the chute, thereby placing much force on that tube through his back.

Other manufacturers have tried to solve the problem of protecting the tube by placing it outside of the chute, as shown in FIGS. 1–3 of U.S. Pat. No. 3,931,877, issued to Albaugh on Jan. 13, 1976. Such an arrangement, however, is not desirable for various reasons. First, the tube must be stronger than would be required if it were placed within the chute because it does not have the chute's protection against the weather, making the tube more expensive. Secondly, the tube, made rigid for protection against the weather and having a rigid duct connecting the silo to the tube, relies on tight seals between the duct and tube and between the duct and the silo to prevent leakage of ensilage and thus suffers the same disadvantages of the sealed silo discharge assembly described in Price above. Thirdly, movement of the duct relative to the rigid stationary tube is required to enable removal of ensilage at various levels in the silo. The duct rides along the tube on wheels and tracks, which are expensive to build, install, and maintain. Finally, access to the tube for purposes of inspection, removal, or replacement is much more difficult in such a system than in a system where the tube may be easily reached from an enclosed manway.

Other discharge tubes in vertical silo chutes are non-rigid, being made of materials such as poly-plastic. These non-rigid discharge tubes, or bags, eliminate the problem of inadequately sealed rigid tubes, but current systems using them are not completely satisfactory from the standpoint of economy of operation. A cloth bag in combination with a funnel attached to the bag's top and a weight ring attached to the bag's bottom, serve as the silo discharge assembly, as is described and shown in the single page brochure, "Forage Funnel," from Fiberdome, Inc., Lake Mills, Wis. With the funnel in the silo's highest window, the original length of the bag is approximately equal to the distance from the bottom of the funnel to the level below the chute where it is desired that the ensilage be discharged. When the funnel is placed in a lower window so that ensilage at lower points within the silo may be removed, the poly-plastic bag is lowered as well and its opening or bottom will be below the desired level. To ensure unimpeded flow of ensilage through the lowered bag to the desired level, and to prevent crimping of the bag when it is lowered sufficiently to touch the ground, the bag must be cut so that its lower end is at the desired level, and the weight ring replaced at the newly-cut bottom of the bag. The practice of cutting the bag when lowering the funnel is wasteful, as the bag cannot be thereafter used when the silo is refilled and it is desired to return the funnel to the upper windows.

SUMMARY OF THE INVENTION

The invention is a silo discharge pipe assembly for use with a vertically upright silo having a side wall with a plurality of spaced-apart windows through which ensilage may be discharged, and comprises an elongated, collapsible ensilage bag with upper and lower ends extending vertically along and spaced apart from the side wall, a rigid, tubular pipe having an upper end to which the bag is detachably connected, clamp means for attaching the bag to the upper end of the pipe, funnel conduit means, and means for attaching the funnel conduit means to the bag. The funnel conduit means are detachably and selectively connectable at one end to one of the windows, and extend from that window generally downwardly to the upper end of the bag for transferring ensilage from the interior of the silo to the bag. The nylon bag is telescopingly collapsible upon the pipe so as to permit the bag to be collapsed thereon when less than the bag's entire length is needed to transfer the ensilage.

The silo discharge pipe assembly in accordance with the present invention offers several advantages over the prior art arrangements. The non-rigid discharge tubes or nylon bags described herein have no openings along their sides through which the base of a funnel need be admitted, and thus there is no need for adjustable or coupling sleeves and no possibility of ensilage leaking through those openings and soiling the chute or ladder rungs because of an inadequately sealing sleeves.

Secondly, the present invention affords protection to the discharge tube not offered in other designs. The tube is recessed in a trough or bubble outside the perimeter of the U-shaped chute forming the manway, aiding in the prevention of tube damage that can be caused by one abutting against that tube while climbing or standing on the ladder rungs. The assembly shown in the present invention affords this protection in a simple, economical, and maintenance-free way.

Finally, the invention precludes the need for frequently purchasing non-rigid plastic bags to replace those cut into pieces so that ensilage from lower levels in a silo may be expediently removed therethrough.

Other objects and advantages of the invention will hereinafter appear.

BRIEF DESCRIPTION OF THE DRAWINGS

FIG. 2 is a side elevational view, in section and with parts broken away, of the silo discharge pipe assembly in place in a silo chute, showing the extension pipe at the lower end of the assembly;

FIG. 3 is a sectional view taken along line 3—3 of FIG. 2, showing the position of the bag within the chute;

FIG. 4 is a fragmentary, elevational view, in section and on an enlarged scale, of the discharge pipe shown in FIG. 1 and as attached to the floor of the panel adjacent the chute access door;

FIG. 5 is an elevation view partially in section, of the attachment between the bag and the funnel conduit means, as shown in FIG. 2, but on an enlarged scale.

FIG. 6 is a perspective, fragmentary view showing the swingable platform mounted on the silo wall and in the horizontal position.

FIG. 7 is a fragmentary, sectional view of the swivelable mounting of the extension pipe shown in FIG. 2.

DESCRIPTION OF A PREFERRED EMBODIMENT

Figure 1:
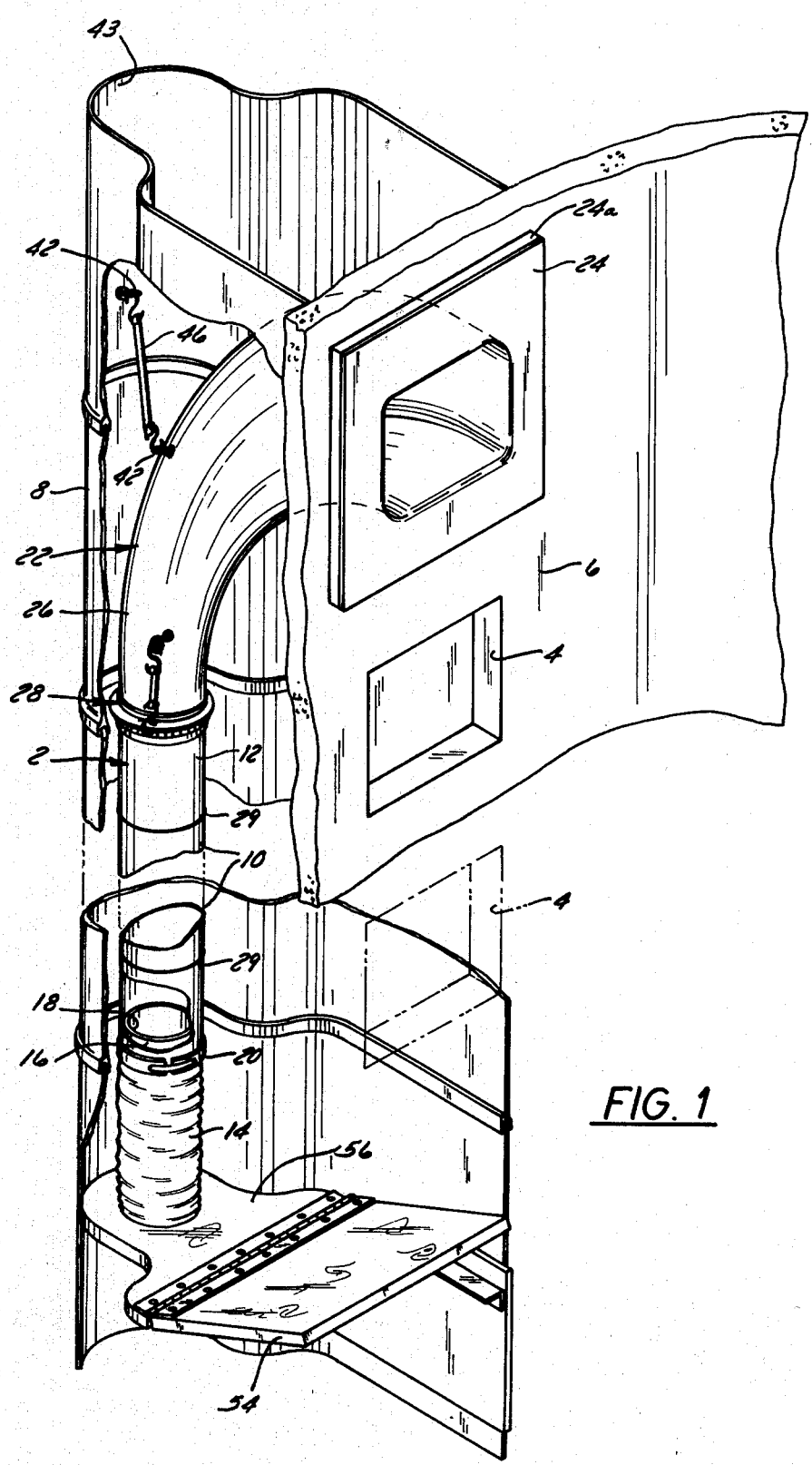
FIG. 1 is a perspective view of the silo discharge pipe assembly a certain portion of which is shown as broken away for clarity, and made in accordance with the present invention, the assembly being shown in place in a silo chute and fragmentarily showing the silo wall and chute.

The silo discharge pipe assembly 2 (FIG. 1) is generally for use with a vertically upright silo which is unloaded through windows 4 vertically spaced apart, along the silo wall 6. Ensilage contained in the silo is conventionally transferred through one of the windows by a conventional mechanical silo unloader (not shown), and from which the ensilage falls through a vertical access chute 8, attached to the silo and in communication with the windows 4 in the silo wall 6, to the ground below. To maintain a relatively clean condition within the chute 8, the ensilage is conveyed through the silo discharge pipe assembly 2 now to be described.

The assembly 2 includes an elongated, flexible and collapsible, ensilage discharge bag 10, having an upper end 12 and lower end 14, and extending vertically along and spaced from the side wall 6. Materials such as nylon tube are suitable for the bag 10, as may be other materials which are dust-tight and also collapsible or capable of being gathered on a discharge pipe 16.

The discharge pipe 16 is rigid, stationary, and has an upper end 18 to which the bag 10 is detachably connected by clamp means 20. Funnel conduit means 22 is detachably and selectively connectible at one end to any one of the windows 4, and at its other end to the upper end 12 of bag 10. The part of funnel conduit means 22 attached to the window 4 is the funnel comprising a transversely extending flange 24 larger than the windows 4, and the portion connected to the upper end 12 of bag 10 is the downwardmost and outwardmost portion of an elbow or substantially right-angled conduit 26, outwardmost meaning that dimension horizontally farthest from silo wall 6. Because the funnel conduit means 22 may be placed in any of the windows 4, the bag 10 must be at least as long as the distance from the lowermost position of the conduit 26 to the upper end 18 of pipe 16, when the funnel conduit means 22 is in the silo's vertically highest window 4. Clamp means 20 attach bag 10 to the pipe 16 and means 28 attach the bag 10 to the lowermost portion of the conduit 26. The clamp means 20 and means 28 maintain the bag 10 between the lowermost portion the conduit 26 and the upper end of pipe 16 in taut suspension, preventing crimping of the bag 10 which would restrict the flow of ensilage therethrough. To further discourage flow restriction, the bag 10 has circumferential stiffening rib means 29 to prevent bag collapse.

When the funnel conduit means 22 are placed within a window 4 other than the vertically highest, the bag's length is greater than the distance between the lower end of conduit 26 and the upper end of pipe 16. To prevent crimping of the bag 10 between these two points, the excessive length is telescopingly collapsed upon pipe 16, as shown in FIGS. 1 and 2. To collapse the excessive length, the clamp means 20 are loosened and the bag 10 manually gathered upon pipe 16 until the length of bag 10 between the bottom of conduit 26 and the top of pipe 16 is short enough to ensure a taut, crimp-free fit when clamp means 20 are retightened on pipe 16. The collapsed portion of bag 10 on pipe 16 is positioned vertically below clamp means 20.

An alternate embodiment would include a bag 10 in a plurality of sections having zipper means around their adjacent ends for detachably engaging the sections to each other. Then, as the funnel conduit means 22 were lowered or raised to other windows 4, sections could be removed or added to the bag 10, respectively, as required. Any extra length of bag 10 could still be collapsed around tube 16, as described hereinabove.

Means 28 for attaching funnel conduit means 22 to the upper end 12 of bag 10 can include a collar 30 attached to bag 10 with tube clamp 32. (FIG. 5). The collar 30 has a pair of holes 34 on opposite sides therein, and conduit 26 has a pair of eye bolts 36 oriented so that one hole 34 and one eye bolt 36 may be engaged by an S-hook 38 at each end of a rubber strap 40. Each of the two rubber straps 40 engaging an eye bolt 36 and a hole 34 keeps the lower end of conduit 26 tightly engaged to the upper end 12 of bag 10. In addition, eye bolts 42 are placed in the right-angled portion of conduit 26 and in the integral, vertical trough 43 of the U-shaped chute 8. S-hooks 44 at the end of a rubber strap 46 maintain funnel conduit means 22 in its proper orientation, that is, extending vertically along and spaced apart from the silo wall 6. Eye bolts 42 are vertically spaced apart and located throughout trough 43, as is necessary, so that strap 46 can hold conduit means 22 in its proper orientation irregardless of the window 4 that the conduit means 22 is placed in.

To move the funnel conduit means 22 from one window 4 to another, the means 22 are released from the trough 43 by disengaging strap 46 therefrom and from the bag 10 by disengaging straps 40 from the holes 34 in collar 30. From the interior of the silo, the flange 24, which has attached thereto rubber seal means 24a and abuts against the interior of the silo wall 6, thereby forming a seal between the interior and the chute 8, is pulled away from the window 4 and into the silo, bringing the entire funnel conduit means 22 with it. The means 22 are then inserted through the desired window 4, the conduit 26 entering the window 4 first. The bag 10 is repositioned to meet the lower end of conduit 26, and straps 40 and 46 are reinserted into holes 34 and eyebolt 42, respectively.

The pipe 16, at its open end, is seen in FIG. 2 to have swivelably connected thereto an extension pipe 48. When in the position shown by the solids lines in that figure, the ensilage falling therethrough will land on a conveyor 50 for automatic transfer to another site. With the extension 48 swiveled into the position shown in phantom in FIG. 2, the ensilage will fall into a manually movable feed cart 52. The extension pipe 48 is preferably mounted to the open end of pipe 16 at a point well below the lowest point upon which bag 10 will be collapsed as it is desirable that none of bag 10 ever come in contact with the swivelably movable extension pipe 48, but only with the rigid, stationary pipe 16. For example, as the mounting is shown in FIG. 7, swivelably movable extension pipe 48 has a flange 49 which rides upon a retaining collar 51. The flange 49 and collar 51 are both below the level of a floor 56 within the chute 8. As the bag 10 cannot extend below the floor and thus cannot be collapsed upon any portion of the pipe 16 below the floor 56, and as the extension pipe 48 contacts only that portion of pipe 16 below the floor, this arrangement leaves no possibility that the bag 10 will contact extension pipe 48.

Horizontally-disposed access door 54 and floor 56 are within the chute 8 and serve as a support for stationary pipe 16 and as a means for preserving cleanliness within the chute 8 while maintaining overhead access to conveying equipment below the door 54 and floor 56. Pipe 16 extends through floor 56, and the collapsed portion of bag 10 is collapsed only on that portion of the pipe 16 above floor 56. Door 54 and floor 56 typically are hinged to each other but may also be simply adjacent one another, the door 54 in that case being liftable so that access therebelow may be obtained. The door 54 and floor 56 together are of substantially the same shape as the chute, and the orifice 58 through which pipe 16 extends is tightly fitted. Together, this design prevents updraft of ensilage being discharged below door 54 and floor 56 through the open end of pipe 16 or extension pipe 48. The pipe 16 may be fixedly attached to the floor 56 with a flanged ring 60, as shown in FIG. 4.

One of the reasons why it is important that the chute 8 be kept clean is that there are a plurality of ladder rungs 62 attached to the silo wall 6 and between the windows 4. Accumulation of ensilage on these vertically spaced-apart rungs 62 can make them very slippery and thus dangerous to climb. Further, in a tall silo, the climb from bottom to top may exceed seventy feet. Such a climb of that much can cause short-windedness in a person, resulting in dangerous fatigue. To provide the silo climber with a rest station, a swingable platform 64 (FIG. 6) is mounted on and pivotable about at its pivoting end 65 a pivot bracket 66, which pivot bracket 66 is rigidly mounted to and normal to the silo wall 6 off to one side of rungs 62. When in the vertical or out-of-the-way storage position, the platform 64 is not in the path of the rung climber. When in the horizontal position, a position in which the platform 64 may be easily manually placed by the climber, the platform 64 rests at its non-pivoting end 68 on support bracket 70, which support bracket 70 is rigidly mounted on and normal to the silo wall. A rope 72 may be attached to the non-pivoting end 68 of platform 64, and the climber may use the rope to elevate the platform 64 after he has rested and is ready to recommence his ascent.

Recapitulation

The invention provides a silo discharge pipe assembly whose tube or bag is made of a collapsible material. Such non-rigid tubes need no openings along their sides and thus will not lose ensilage through sealing sleeves with inadequate seals. Further, the U-shaped chute and integral trough offer economical and space-efficient protection of the bag from the weather and from damage due to a silo climber's abutting against the bag. Finally, the invention enables collapsible bags to be reused many times, as there is no need to cut the long bags in order to use them for discharging ensilage from a relatively low window.

I claim:

1. A silo discharge pipe assembly for use with a vertically upright silo having a side wall with a plurality of vertically spaced-apart windows through which ensilage may be discharged; said assembly comprising an elongated, flexible, collapsible, ensilage discharge bag with an upper and a lower end and extending vertically along and spaced apart from said side wall, a rigid, stationary, tubular pipe extending into said lower end of said bag and having an upper end to which said bag is detachably connected, and also having an open lower end; clamp means for attaching said bag to said upper end of said pipe; funnel conduit means detachably and selectively connectable at one end to one of said windows and extending from said window and generally downwardly to said upper end of said bag for transferring ensilage from the interior of said silo to said bag; means for attaching said conduit means to said bag, and said bag being telescopingly collapsible upon said pipe so as to permit said bag to be collapsed thereon when less than said bag's entire length is needed to transfer said ensilage.

2. The silo discharge pipe assembly of claim 1, wherein said funnel conduit means comprises a rigid, substantially right-angled conduit having a transversely extending flange at one end, said flange being larger than said windows whereby said funnel conduit means may be attached to one of said windows by inserting said conduit through said window from within said silo, said flange abuttable against the interior of said side wall, and said conduit extending outwardly and downwardly from said window.

3. The silo discharge pipe assembly of claim 1, including an extension pipe swivelably connected to said open lower end of said pipe to permit ensilage to be selectively deposited at different locations.

4. The silo discharge pipe assembly of claim 2, including an extension pipe swivelably connected to said open lower end of said pipe to permit ensilage to be selectively deposited at different locations.

5. The silo discharge pipe assembly described in claim 1, wherein said ensilage discharge bag is comprised of a plurality of sections having means around their adjacent ends for detachably engaging said sections to each other.

6. The silo discharge pipe assembly described in claim 2, wherein said ensilage discharge bag is comprised of a plurality of sections having means around their adjacent ends for detachably engaging said sections to each other.

7. The silo discharge pipe assembly described in claim 3, wherein said ensilage discharge bag is comprised of a plurality of sections having means around their adjacent ends for detachably engaging said sections to each other.

8. The silo discharge pipe assembly described in claim 4, wherein said ensilage discharge bag is comprised of a plurality of sections having means around their adjacent ends for detachably engaging said sections to each other.

9. The silo discharge pipe assembly described in claim 1, wherein said ensilage discharge bag has circumferential stiffening rib means to prevent collapse of said bag.

10. The silo discharge pipe assembly described in claim 2, wherein said ensilage discharge bag has circumferential stiffening rib means to prevent collapse of said bag.

11. The silo discharge pipe assembly described in claim 3, wherein said ensilage discharge bag has circumferential stiffening rib means to prevent collapse of said bag.

12. The silo discharge pipe assembly described in claim 4, wherein said ensilage discharge bag has circumferential stiffening rib means to prevent collapse of said bag.

13. In combination with a vertical silo having a plurality of vertically spaced apart windows along one side for the selective discharge of ensilage therethrough, a vertical access chute attached to said silo and in communication with said silo wall windows whereby access may be had through said chute to said windows, said chute having an outer wall of generally U-shaped and also having integral therewith a vertical trough along the outer side of said chute, a silo discharge pipe assembly selectively attachable to any one of said silo windows and extending into and downwardly within said trough for the conveyance of ensilage from said silo opening.

14. The combination set forth in claim 13 further characterized in that said silo discharge pipe assembly comprises an elongated, flexible, collapsible, ensilage discharge bag with an upper and a lower end and extending vertically along and within said trough; a rigid, stationary tubular pipe extending into said lower end of said bag and having an upper end to which said bag is detachably connected, and also having an open lower end; clamp means for attaching said bag to said upper end of said pipe; funnel conduit means detachably and selectively connectable at one end to one of said windows and extending from said window and generally downwardly to said upper end of said bag for transferring ensilage from the interior of said silo to said bag; means for attaching said conduit means to said bag, and said bag being telescopingly collapsible upon said pipe so as to permit said bag to be collapsed thereon when less than said bag's entire length is needed to transfer said ensilage.

15. The combination set forth in claim 13, further comprising a horizontally disposed access door within said chute and adjacent said pipe for preventing updraft of discharged ensilage back up into said chute.

16. The combination set forth in claim 14, further comprising a horizontally disposed access door within said chute and adjacent said pipe for preventing updraft of discharged ensilage back up into said chute.

17. The combination set forth in claim 13, further comprising a plurality of vertically spaced apart ladder rungs attached to said silo wall and between said windows, and comprising a swingable platform mounted on said silo wall, said platform selectively swingable between a vertical disposition for out-of-the-way storage and a horizontal person-supporting position.

18. The combination set forth in claim 14, further comprising a plurality of vertically spaced apart ladder rungs attached to said silo wall and between said windows, and comprising a swingable platform mounted on said silo wall, said platform selectively swingable between a vertical disposition for out-of-the-way storage and a horizontal person-supporting position.

19. The combination set forth in claim 15, further comprising a plurality of vertically spaced apart ladder rungs attached to said silo wall and between said windows, and comprising a swingable platform mounted on said silo wall, said platform selectively swingable between a vertical disposition for out-of-the-way storage and a horizontal person-supporting position.

20. The combination set forth in claim 16, further comprising a plurality of vertically spaced apart ladder rungs attached to said silo wall and between said windows, and comprising a swingable platform mounted on said silo wall, said platform selectively swingable between a vertical disposition for out-of-the-way storage and a horizontal person-supporting position.

21. The combination set forth in claim 14, including an extension pipe swivelably connected to said open lower end of said pipe to permit ensilage to be selectively deposited at different locations.

22. The combination set forth in claim 15, including an extension pipe swivelably connected to said open lower end of said pipe to permit ensilage to be selectively deposited at different locations.

23. The combination set forth in claim 16, including an extension pipe swivelably connected to said open lower end of said pipe to permit ensilage to be selectively deposited at different locations.

24. The combination set forth in claim 17, including an extension pipe swivelably connected to said open lower end of said pipe to permit ensilage to be selectively deposited at different locations.

25. The combination set forth in claim 18, including an extension pipe swivelably connected to said open lower end of said pipe to permit ensilage to be selectively deposited at different locations.

26. The combination set forth in claim 19, including an extension pipe swivelably connected to said open lower end of said pipe to permit ensilage to be selectively deposited at different locations.

27. The combination set forth in claim 20, including an extension pipe swivelably connected to said open lower end of said pipe to permit ensilage to be selectively deposited at different locations.

28. In combination with a vertical silo having a plurality of vertically spaced apart windows along one side for the selective discharge of ensilage therethrough, a vertical access chute attached to said silo and in communication with said silo wall windows whereby access may be had through said chute to said windows, said chute having an outer wall of generally U-shape and also having integral therewith a vertical trough along the outer side of said chute, a silo discharge pipe assembly selectively attachable to any one of said silo windows and extending into and downwardly within said trough for the conveyance of ensilage from said silo opening, said silo discharge pipe assembly comprising an elongated, stationary, collapsible, ensilage discharge bag with an upper and lower end and with circumferential stiffening rib means to prevent collapse of said bag, said bag extending vertically along and within said trough; a rigid, stationary, tubular pipe extending into said lower end of said bag and having an upper end to which said bag is detachably connected and also having an open lower end, said open lower end having an extension pipe swivelably connected thereto to permit ensilage to be selectively deposited at different locations; clamp means for attaching said bag to said upper end of said pipe; funnel conduit means detachably and selectively connectable at one end to one of said windows and extending from said window outwardly and downwardly to said upper end of said bag for transferring ensilage from the interior of said silo to said bag, said funnel conduit means comprising a rigid, substantially right-angled conduit having a transversely extending flange at one end, said flange being larger than said windows whereby said funnel conduit means may be attached to one of said windows by inserting said conduit through said window from within said silo, and said flange abuttable against the interior of said side wall; means for attaching said conduit means to said bag; said bag being telescopingly collapsible upon said pipe so as to permit said bag to be collapsed thereon when less than said bag's entire length is needed to transfer said ensilage; further comprising a horizontally disposed access door within said chute and adjacent said pipe for preventing updraft of discharged ensilage back up into said chute; and comprising a plurality of vertically spaced apart ladder rungs attached to said silo wall and between said windows, and comprising a swingable platform mounted on said silo wall, said platform selectively swingable between a vertical disposition for out-of-the-way storage and a horizontal person-supporting position.

* * * * *